US 6,609,327 B2

(12) United States Patent
Stoico et al.

(10) Patent No.: US 6,609,327 B2
(45) Date of Patent: Aug. 26, 2003

(54) ANIMAL TRAP FOR SMALL ANIMALS

(76) Inventors: Kenneth E. Stoico, 27003 Railroad, Warren, MI (US) 48092; Stephen L. Prucher, 52 N. Main, Clarkston, MI (US) 48346

( * ) Notice: Subject to any disclaimer, the term of this patent is extended or adjusted under 35 U.S.C. 154(b) by 0 days.

(21) Appl. No.: 09/835,244

(22) Filed: Apr. 13, 2001

(65) Prior Publication Data

US 2002/0011019 A1 Jan. 31, 2002

Related U.S. Application Data

(60) Provisional application No. 60/196,723, filed on Apr. 13, 2000.

(51) Int. Cl.$^7$ .......................... A01M 23/18; A01M 23/20
(52) U.S. Cl. ........................................................ 43/61
(58) Field of Search .............................. 43/58, 60, 61, 43/65, 67

(56) References Cited

U.S. PATENT DOCUMENTS

| 363,536 A | * | 5/1887 | Oliver | 43/61 |
|---|---|---|---|---|
| 1,257,244 A | * | 2/1918 | Kaizumi | 43/61 |
| 2,087,644 A | * | 7/1937 | Harbison | 43/67 |
| 2,616,210 A | * | 11/1952 | Reeb | 43/61 |
| 3,200,534 A | * | 8/1965 | Wood et al. | 43/61 |
| 3,394,487 A | * | 7/1968 | Wood et al. | 43/61 |
| 4,546,568 A | * | 10/1985 | Seyler | 43/61 |
| 4,590,704 A | * | 5/1986 | Volk | 43/61 |
| 4,912,872 A | * | 4/1990 | Wynn et al. | 43/61 |
| 6,164,008 A | * | 12/2000 | Kelley | 43/61 |

FOREIGN PATENT DOCUMENTS

| DE | 19857452 B1 | * | 6/2000 | |
|---|---|---|---|---|
| GB | 623967 B1 | * | 5/1949 | 43/61 |
| GB | 2258381 A1 | * | 2/1993 | 43/61 |

\* cited by examiner

Primary Examiner—Darren W. Ark
(74) Attorney, Agent, or Firm—Arnold S. Weintraub, Esq.

(57) ABSTRACT

A live animal trap for capturing and restraining a small animal comprises a rectangular mesh cage having an open front sized to admit an animal to be trapped, and a trap door hingedly affixed to the cage and movable between raised and lowered positions, respectively, permitting entry to and preventing escape from the cage. Embodiments are disclosed of gravity and/or spring assisted latching and tripping structures for releasably securing the trap door in the open position and responsive to an animal seeking to get to bait in the back of the cage. In one, a spring assisted brace member is hingedly affixed to and drives the lower end of the trap door into the closed position. In another, a multi-purpose guide collar locks and drives the trap door in and for movement between the raised and lowered positions, and assists in animal release and in resetting of the trap.

4 Claims, 6 Drawing Sheets

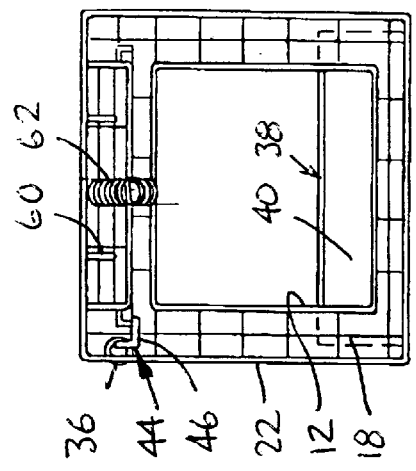
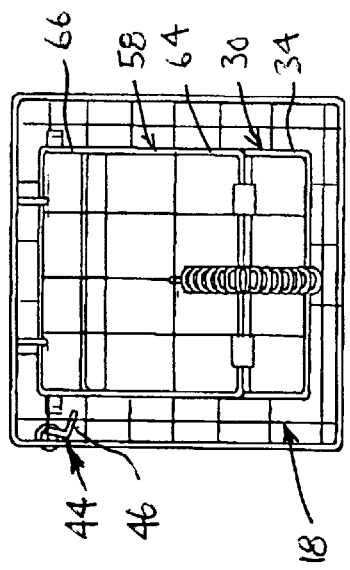
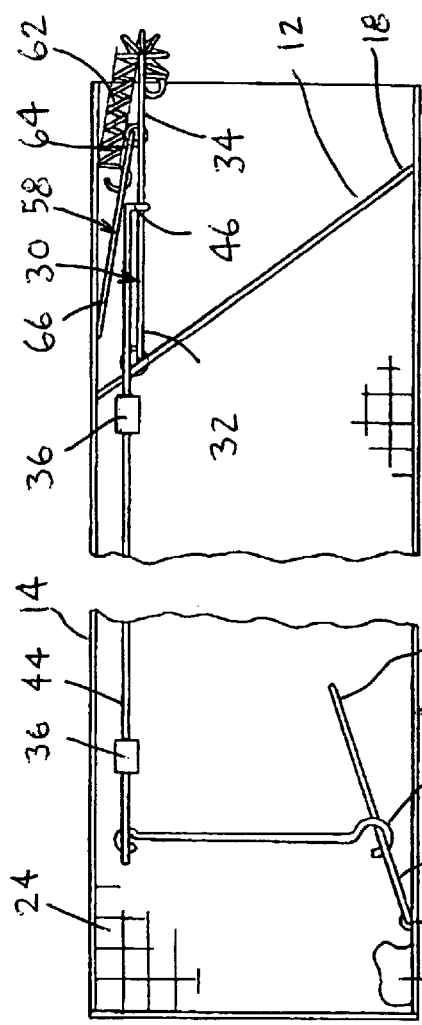
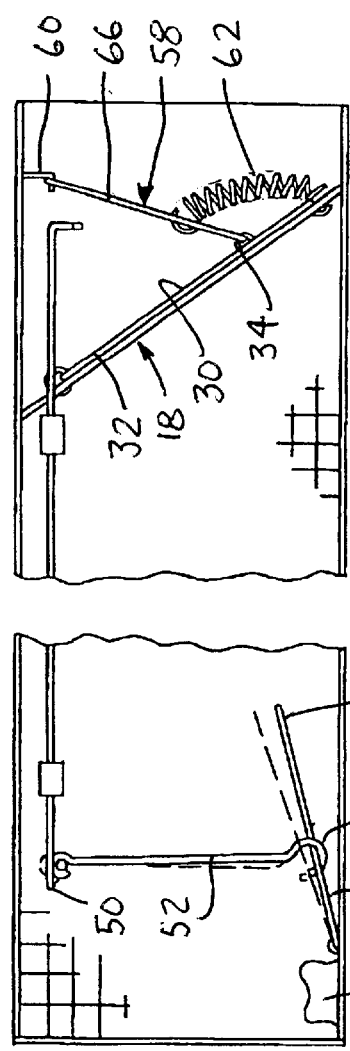
FIG. 3B
FIG. 4B
FIG. 3A
FIG. 4A

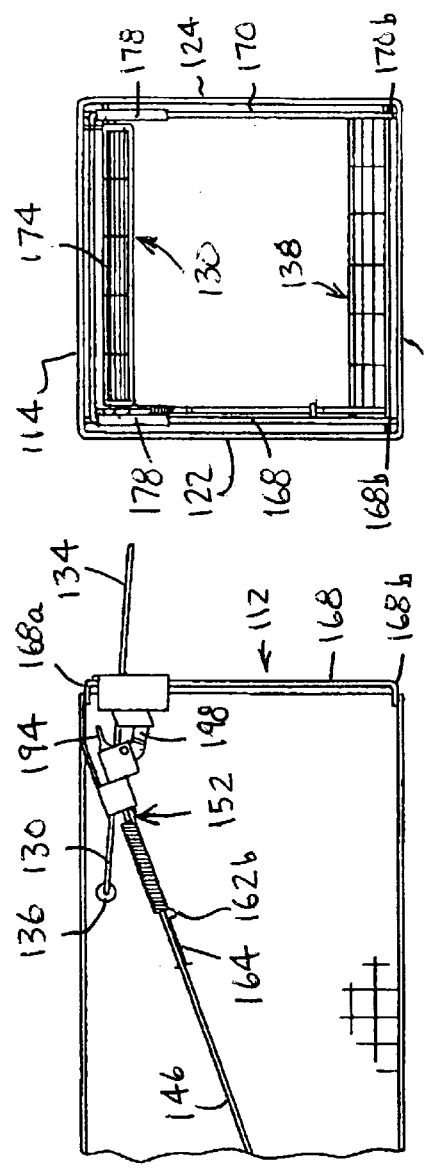
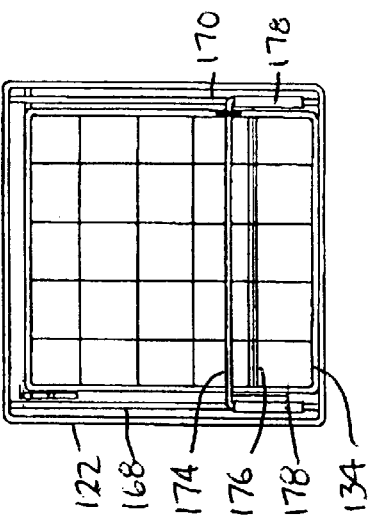
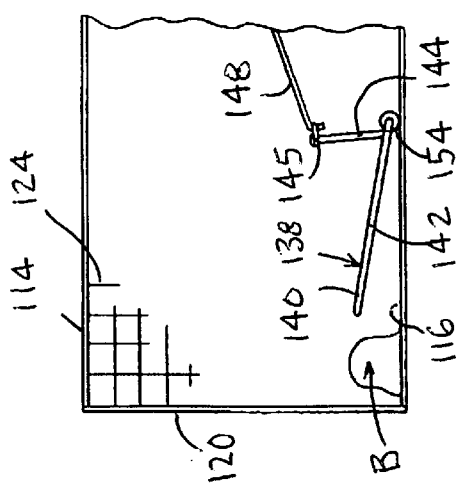
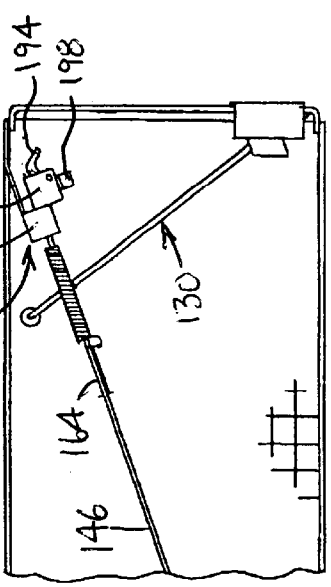
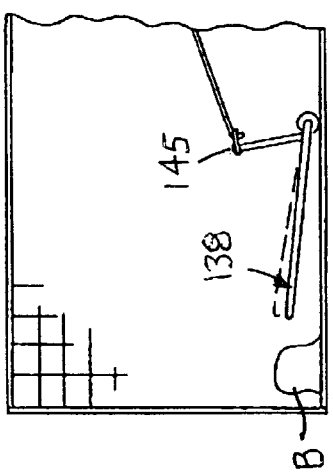

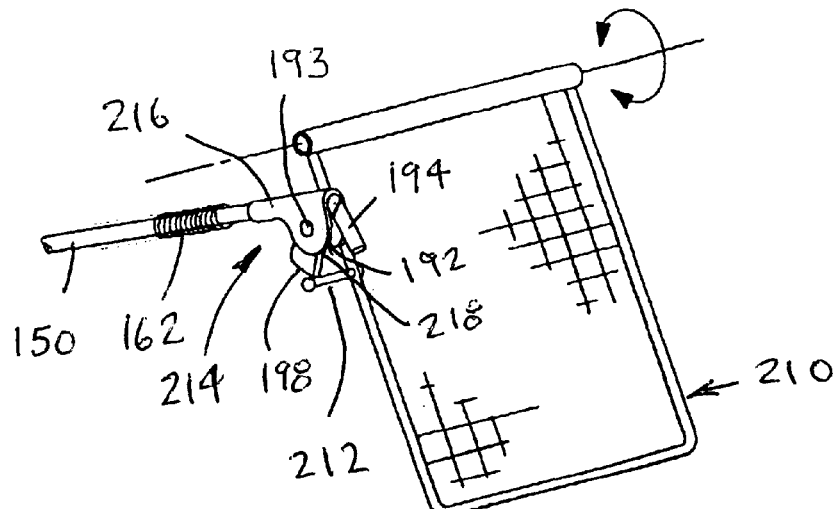
FIG. 10  DOOR CLOSED POSITION
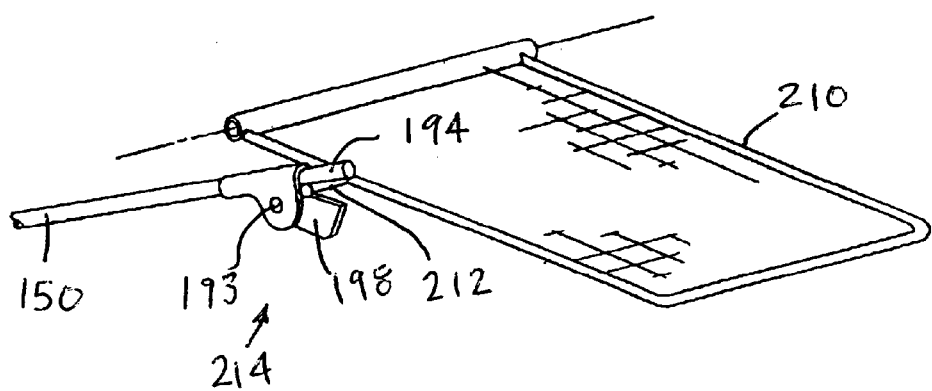
FIG. 11  DOOR OPEN POSITION

ANIMAL TRAP FOR SMALL ANIMALS

CROSS-REFERENCE TO RELATED APPLICATIONS

This Application is a completion application based on co-pending U.S. Provisional Application Ser. No. 60/196,723, filed Apr. 13, 2000, having the title "Animal Trap", the disclosure of which is hereby specifically incorporated herein by reference.

BACKGROUND OF THE INVENTION

1. Field of the Invention

The present invention relates, in general, to improvements in traps for small animals in the form of a cage structure for trapping and holding, without harming, the animal whereby the animal can be relocated to another area. More particularly, the invention relates to spring and gravity actuated closure arrangements for use in such cage structures.

2. Description of Prior Art

Animal traps comprising a cage of metal mesh and constructed with locking means for locking a trap door in a closed position are known. The animal trap typically includes a tripping mechanism that is tripped when the animal is lured into the cage to obtain bait placed therein and operates to cause the trap door to move between an open position and into a closed position. A locking mechanism cooperates to releasably lock the trap door in the closed position.

In some animal traps, the trap door falls by gravity and into engagement with a lock member to ensure that the door does not open and allow the trapped animal to escape. These traps are simple in operation and construction.

However, since animal traps are typically placed outside and are subject to the environment, they can rust or otherwise be subject to mud or other material. A trap door that relies solely on gravity to move into its closed position might have to rely on its ability to overcome the problems associated with its prolonged exposure to the environment and may not close at all or only partially, thereby permitting the animal to escape from the cage.

To overcome certain problems associated with the environment, some animal traps have arranged springs and linkage rods together with one another and with the trap door whereby to positively bias the trap door into the closed position or a latch member into a locked relation with the trap door. Depending on the spring and trap door arrangement, a biased trap door could close about and harm the animal.

There is always a need for improvement in animal traps that enable a small animal to be trapped without harm.

An object of this invention is the provision of an animal trap that enables small animals to be safely trapped in a cage for relocation to another place.

Another object of this invention is an animal trap having an improved closure, tripping and locking means for containing an animal that enters the trap.

Still another object of this invention is the provision of an animal trap for small animals, the trap including a simple yet effective tripping mechanism that is actuated by the animal entering the trap.

SUMMARY OF THE INVENTION

According to a first embodiment of this invention there is provided an animal trap including a tripping mechanism operably connected to a spring-loaded closure structure that cooperates with a trap door to provide positive and rapid snap closure of the trap door without harming the animal. In particular, the animal trap comprises:

- a cage having a top, a bottom, a back, and side walls of mesh or like material, the side walls joining the top, bottom, and back walls whereby to form an enclosure having a front opening enterable by an animal,
- a trap door having a top edge portion hingedly affixed to the top of the cage and a bottom edge portion, said trap door being rotatable between a raised cage open position permitting entry into the cage and into a lowered cage closed position wherein the trap door is in covering relation with the front opening, this door being sized substantially equal to the size of the first opening;
- a trip lever hingedly affixed to the cage and disposed within the enclosure, the trip lever being tripped by an animal trying to get to bait in the back of the cage;
- a trip rod rotatably mounted to said cage and including a catch member for engaging and maintaining the trap door in the raised cage open position,
- a linkage structure connecting the trip rod to the trip lever, and
- a spring operated locking structure for biasing the trap door from said raised position and toward said lowered position and releasably maintaining the trap door in the lowered cage closed position,
- whereby movement of the trip lever is transmitted by the linkage structure to the trip rod causing the trip rod to rotate and the catch member to be dislodged from its engagement with the trap door whereupon gravity and the spring operated locking structure act to drive the trap door into closing relation with the front opening.

The spring operated locking structure comprises a brace member having a first end portion hingedly connected to the trap door proximate to the bottom edge portion thereof and a second end portion, a spring member connecting the bottom edge portion of the trap door to the brace member, and a catch member proximate to the top of the cage for engaging the second end portion of the brace member. In the lowered cage closed position, the free end of the brace member positions the hinged end thereof so as to drive the bottom edge portion of the trap door downwardly and into the cage closed position.

Preferably, the cage includes a front wall of mesh or like material and is provided with a central opening for the animal to enter, the front wall being adapted to be covered by the trap door when in the lowered cage closed position. Preferably, the front wall is disposed at an acute angle to the bottom wall, generally between about 40°–60° thereto. In a particular embodiment, the front wall is at about 45° to the bottom wall and forms the hypotenuse of a 45° right triangle.

In the raised cage open position, the brace member is folded onto the trap door and disposed between the trap door and the top wall of the cage. The second end of the brace member abuts the top wall and cooperates with the spring member (and gravity) to force the brace member and trap door downwardly and away from the top wall of the cage. Substantially simultaneously with release of the trap door, the force of gravity pulls the trap door downwardly, and the spring pulls the brace member away from its overlapped relation with the trap door. The spring forces the free end of the brace member against the top wall of the cage and into engagement with the catch member, the free end acting to drive the trap door (to which the hinged end of the brace member is connected) downwardly.

In the lowered cage closed position, the brace member and the trap door are at an acute angle to one another. The brace member has its second end portion positioned against the top wall and its first edge portion forcing the trap door into the closed position.

According to a second embodiment of this invention there is provided an animal trap including tripping and locking mechanisms operably connected to a closure structure that includes a trap door which operates under gravity to move between a raised position (generally parallel to the top wall of the cage) and to a lowered position (generally vertically extending between the top and bottom walls) to provide positive and rapid closure of the trap door without harming the animal. Similar to the first embodiment, the animal trap of this embodiment comprises a generally rectangularly configured cage comprised of walls of mesh-like construction or material otherwise apertured and having a front opening by which an animal can enter the cage to get to bait in the back of the enclosure.

More particularly, the animal trap of this embodiment comprises:

- a pair of laterally spaced parallel guide posts, the posts extending vertically between the top and bottom walls proximate to the open front of the cage,
- a trap door hingedly affixed to the top of the cage at the front thereof and movable between raised and lowered positions, the trap door having a bottom edge adapted to be proximate to the top and bottom walls, respectively, when the trap door is in the raised and lowered positions, respectively,
- a guide collar connected to the trap door and to the guide posts, the guide collar being mounted to the guide posts for movement relative thereto and between said positions and locking the trap door in the lowered position,
- a lock wheel for releasably holding the guide collar in the raised position and the trap door proximate to the top wall of the cage, the lock wheel being rotatable from a holding position for holding the guide collar in the raised position to a releasing position for releasing the guide collar and trap door,
- a tripper mechanism responsive to the animal entering the cage and operable to release the lock wheel for rotation between said holding and releasing positions, and
- a resetting mechanism for resetting the trap door in the raised position, the resetting mechanism including at least a portion of said guide collar acting on said lock wheel to rotate said lock wheel into the holding position.

A feature of this invention is an animal trap comprised of screen, open mesh, expanded metal and the like construction, which enables wind to pass through without the cage tumbling and allows the bait to be seen and detected by an animal.

Another feature of this invention is an animal trap which efficiently and safely captures small animals, such as rats, skunks, raccoons and other varmints or the like, for relocation.

A desirable feature of the gravity operated and/or spring assisted animal cages described herein above is the simplicity of design, trap setting, ease of animal release, and trap resetting. In a first embodiment, re-setting is staged by the brace member being disengaged and folded over onto the trap door and the combination snapped into the raised position. In a second embodiment, the cage is merely turned 180° over onto itself, causing the guide collar which is coupled to the trap door, to move the trap door back to the raised position and lockingly engage with a lock member.

For a more complete understanding of the invention, reference is made to the following detailed description and accompanying drawings. In the drawings, like reference characters refer to like parts throughout the several views in which:

BRIEF DESCRIPTION OF THE DRAWINGS

FIGS. 3A and 3B are side and front elevation views of the animal trap, with portions of side wall material removed to show detail, illustrating a trip lock arrangement maintaining a trap door in a raised (cage open) open position whereby to permit animal entry into the cage.

FIGS. 4A and 4B are side and front elevation views of the animal trap, corresponding to FIGS. 3A and 3B, respectively, illustrating the trip lock arrangement and the trap door in a lowered (cage closed) position whereby to prevent the animal escaping from the cage.

FIGS. 7A and 7B are side and front elevation views, respectively, of the animal trap of FIGS. 5 and 6 and illustrate a trip lock arrangement maintaining the trap door in a raised (cage open) open position whereby to permit animal entry into the cage.

FIGS. 8A and 8B are side and front elevation views of the animal trap, corresponding to FIGS. 7A and 7B, respectively, and illustrate the trip lock arrangement and the trap door in a lowered (cage closed) position to prevent the animal from escaping from the cage.

FIGS. 10 and 11 are partial views of a modified trap door assembly in a door closed and a door open position, respectively.

DETAILED DESCRIPTION OF THE PREFERRED EMBODIMENTS

Figure 1:
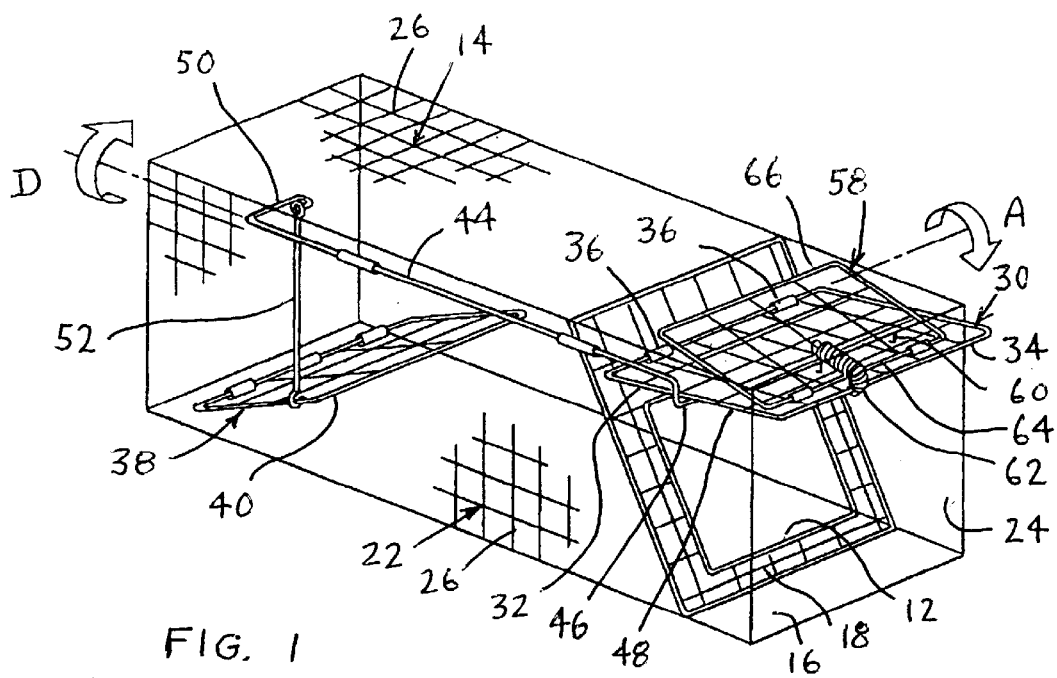
FIGS. 1 and 2 are perspective views, looking rearwardly and forwardly, respectively, of a first embodiment of an animal trap according to the present invention, the animal trap including a closure arrangement and trap door therefor that is spring-loaded and operates under the force of gravity.
Figure 2:
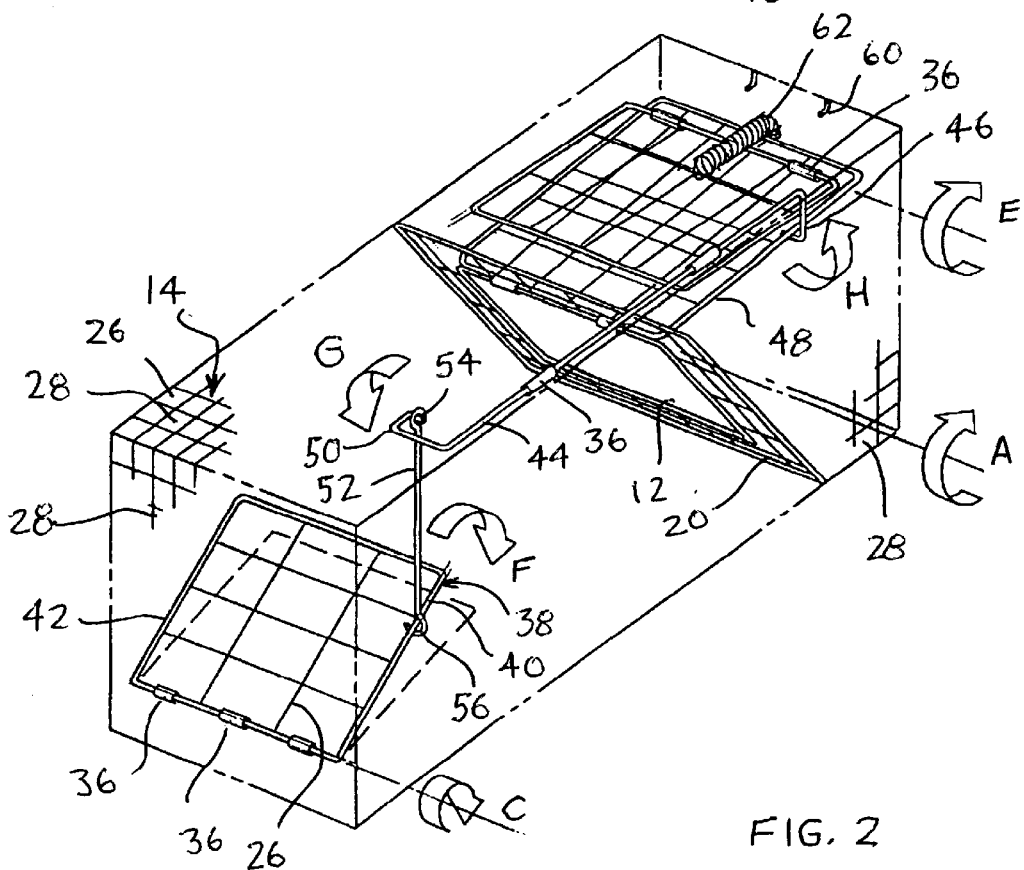
Figure 5:
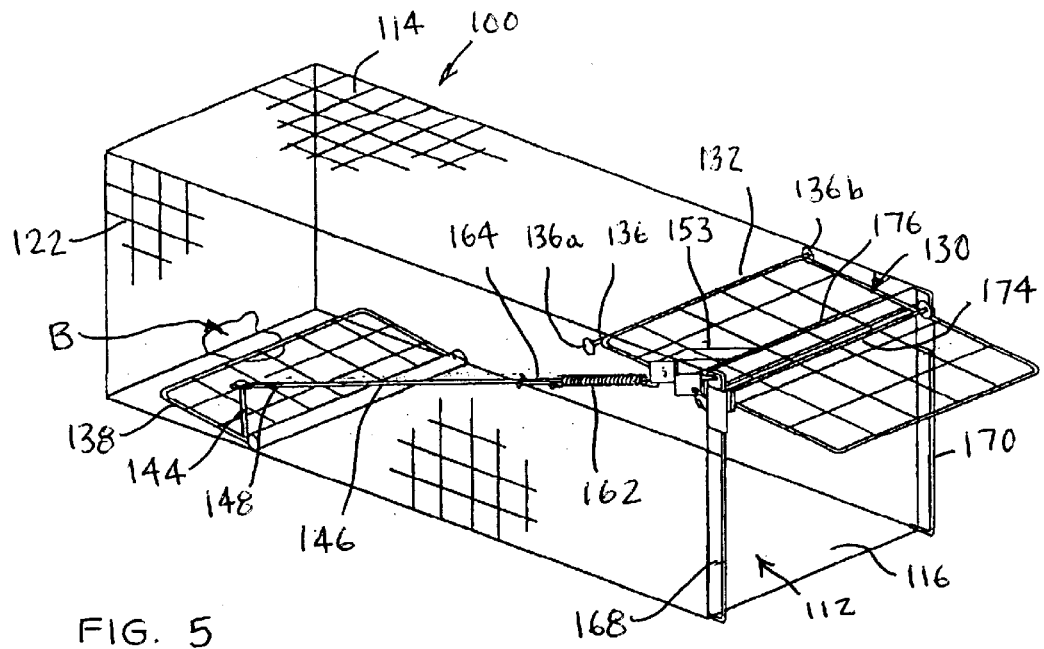
FIGS. 5 and 6 are perspective views, looking rearwardly and forwardly, respectively, of a second embodiment of an animal trap according to the present invention, the animal trap including a closure arrangement and a trap door therefor that uses the force of gravity to close and reset the trap door.
Figure 6:
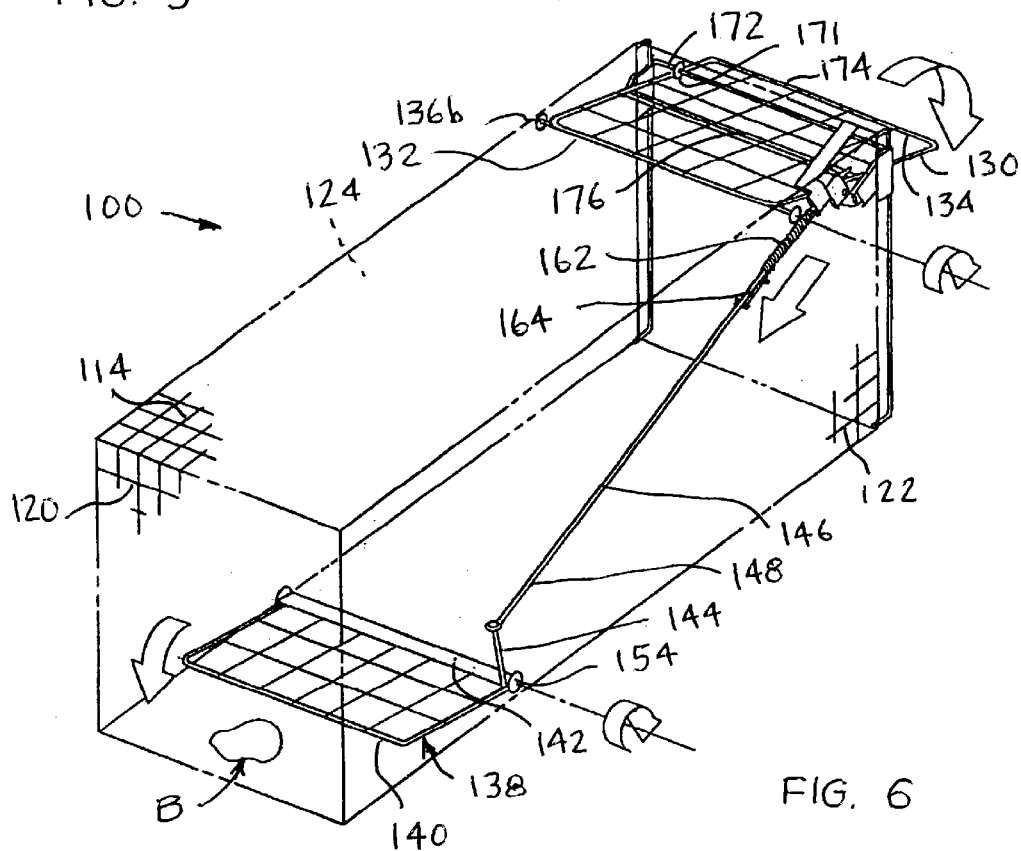
Figure 9A:
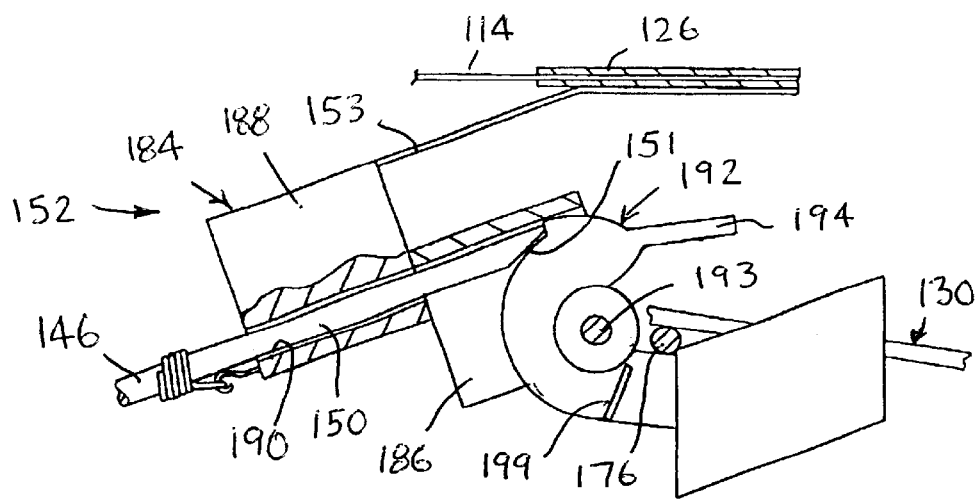
FIGS. 9A and 9B are partial cutaway views corresponding to FIGS. 7A and 7B, respectively, and show the trap door and a latch member in the raised (cage open) position, and the trap door after having been released and moving downwardly towards the lowered (cage closed) position.
Figure 9B:
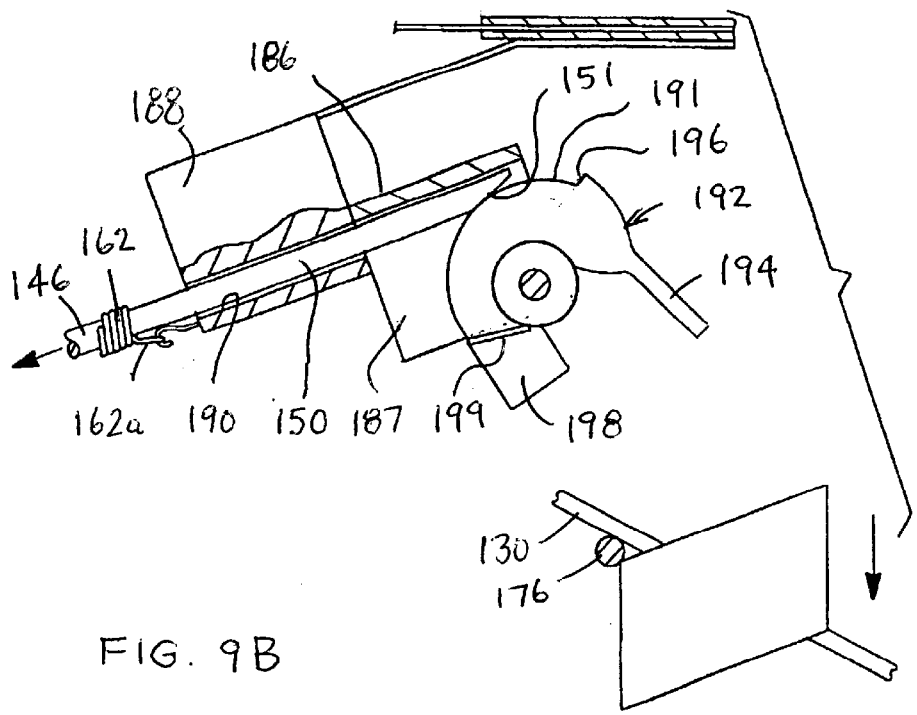

Turning now to the drawings, according to this invention, FIGS. 1–4 and FIGS. 5–9, respectively, illustrate preferred embodiments of an animal trap for small animals, the traps being denoted generally by the numbers 10 and 100. As will be detailed herein below, the animal traps 10 and 100 are similar to each other in that each includes a generally rectangularly formed cage member formed of a mesh or suitably apertured material, has an opening at a front end thereof for an animal to enter, a door closure arrangement that includes a trap door that rotates under the force of gravity from a raised to a lowered position, and a trip lock arrangement that is releasably connected to the trap door and triggered by the animal.

The embodiments primarily differ from one another in the operation of the closure and trap door arrangement. In the animal trap 10 the trap door operates, in part, under the force of gravity and under the action of a spring member. In the animal trap 100, the trap door closes solely under the force of gravity.

Turning to the first embodiment, and in particular to FIGS. 1–4, the animal trap 10 comprises an elongated, generally rectangularly shaped, mesh cage. The cage has generally parallel top and bottom walls 14 and 16 of rectangular shape, generally square front and back walls 18 and 20, and a pair of generally parallel sidewalls 22 and 24 of rectangular shape joining the top, bottom, back and front walls. The cage or enclosure defines an interior for trapping the animal and which is enterable only through an opening 12 formed centrally of the front wall 18.

Each of the walls 14, 16, 18, 20, 22 and 24 are formed by a rectangular grid of reinforcement members 26 to provide body and strength to the enclosure and by a mesh screen 28 to form a complete closure. Preferably the reinforcement members and mesh screen are comprised of steel.

Additionally, if desired, primarily depending on the size and nature of the animal to be trapped, the cage could be constructed in a more durable fashion. In particular, according to this invention, the walls and door of the cage may be comprised of a woven wire openwork construction, or what is oftentimes referred to in the art as "expanded" sheet metal. Expanded sheet metal is the result of a process whereby a single sheet of metal is simultaneously cut or slit and then opened by stretching the sheet whereby to produce a mesh or latticework comprised of a series of diamond-shaped openings. Desirably, the general shape of the cage enclosure can be made by the use of only a single sheet of expanded metal that is provided with three 90° bends whereby to form the walls 14, 22, 16, and 22, and to which shape are attached the front and back walls 18 and 20. The cage walls would be adjoined by any suitable method, such as by welding or other method known by those skilled in the art.

However, if suitably dimensioned, the walls and mesh could be comprised of a suitable polymeric material, wood, reed or other natural material. It is to be understood that many materials that are apertured (or comprised of a foraminous material) would suffice and be known to those skilled in the art. Importantly, the walls of the cage should be suitably apertured to enable the animal to see and smell bait placed in the interior of the cage.

According to this invention, the front wall 18 is at an acute angle to the bottom wall 16 and is generally disposed at an angle of about 40°–60° thereto. Preferably, the front wall 18 is at an angle of about 45° to the top and bottom walls 14 and 16 and forms the hypotenuse of a 45° right triangle.

A trap door 30 of generally rectangular shape and having a top and a bottom edge portion 32 and 34, respectively, is hingedly affixed at the top edge portion 32 thereof to the front wall 18 of the cage. Preferably, the trap door 30 is constructed in a manner similar to that of the above described wall members and comprises a rectangular grid of horizontally and vertically extending reinforcement members 26 and a mesh screen 28 secured thereto. The trap door 30, the opening 12 and the front wall 18 are generally rectangular and/or square in shape, concentric with one another, and the door dimensioned to be slightly larger than that of the opening.

Two or more cylindrical or ring shaped sleeves or hinge members 36 are laterally spaced and fitted about the topmost horizontally disposed reinforcement member 26 on the trap door 30 and a horizontally disposed reinforcement member 26 on the front wall 18. By such connection, the trap door 30 is rotatably mounted to the cage for rotation relative thereto about at an axis "A". The trap door 30 rotates between a first (cage open) position raised above the front opening 12 and generally horizontally disposed relative to the top and bottom walls 14 and 16, and into a second (cage closed) position disposed in lowered covering relation with the front opening and partially engaged with the front wall 18.

A trip lever or trip plate 38 of generally rectangular shape and having a top and a bottom edge portion 40 and 42, respectively, is hingedly affixed at the bottom edge portion 42 thereof to the bottom wall 16 of the cage in the back of the enclosure. The trip lever or trip plate 38 is tripped (i.e., depressed) by the weight of an animal crawling thereover trying to get to bait "B" placed in the back of the cage.

Preferably, the bait is not attached to the trip plate. The bait would be positioned between the back wall 20 and the trip plate 38.

The trip plate 38 is of similar construction as the walls and comprises a rectangular grid of reinforcement members 26 covered with mesh 28. Two or more cylindrical or ring shaped sleeve or hinge members 36 are used to connect a reinforcement member on the bottom wall 16 and which extends laterally between the sidewalls 22 and 24 to a corresponding horizontally disposed reinforcement member on the trip lever 38. By such mounting, the top edge portion 40 of the trip plate 38 is adapted to rotate about an axis "C" and about the plane of the bottom wall 16 and move towards the bottom wall 16 of the cage.

Although the trip plate 38 is shown as being angled upwardly towards the front wall, the trip plate could also angle upwardly towards the back wall 20. Additionally, although shown as being hingedly connected to the bottom wall, the trip plate 38 could be mounted for rotation to a support bar (See FIGS. 5–9) that extends between the side walls.

An axially elongated trip (or actuator) rod 44 is rotatably mounted to the sidewall 22 of the cage and extends between the trap door 30 at the forward end of the cage and the trip plate 38 at the rearward end of the cage. Two or more or more cylindrical or ring shaped hinge members 36 are used to connect the trip rod 44 to a horizontally extending reinforcement member 26 forming the sidewall 22. The trip rod 44 includes an L-shaped link or catch member 46 at the forward end thereof for seating under a side edge 48 of the trap door 30 and maintaining the trap door in the first (cage open) position. As will be described hereinbelow, rotation of the trip rod 44 about its axis "D" operates to dislodge the catch member 46 from engagement with the trap door and release the trap door for closing movement.

A linkage structure comprising first and second links 50 and 52 connects the trip rod 44 to the trip plate 38. The first link 50 extends transversely from the trip rod 44 at the rearward end thereof and is generally parallel to the top wall 14 when the catch member 46 holds the trap door 30 in the cage open position. The second link 52 is arranged vertically and has a first end 54 hingedly connected to the first link 50 and a second end 56 hingedly connected to a reinforcement member 26 along the edge of the trip plate 38.

A spring operated locking structure comprising a brace member 58, a catch member 60 and a coil spring 62 is provided for biasing the trap door 30 towards the second (cage closed) position in covering relation to the opening 12 and releasably maintaining the trap door in the second position.

The brace member 58 is generally planar, rectangularly shaped, and is of similar construction as the walls and comprises a rectangular grid of reinforcement members 26 covered with mesh screen 28. In particular, the brace member 58 has first and second edge portions 64 and 66 and is hingedly affixed at the first edge portion 64 thereof to the trap door 30 proximate the bottom end portion 34 thereof. Two or more cylindrical or ring shaped sleeve or hinge members 36 are used to connect a laterally extending reinforcement member on the trap door 30 to a laterally extending reinforcement member on the brace member 58.

By hingedly mounting the first edge portion 64 to the trap door, the second edge portion 66 of the brace member 58 is adapted to rotate about an axis "E" relative to the trap door. As will be described, the brace member 58 is initially horizontally disposed between the trap door and the top wall 14 in folded, confronting relation above the trap door. Upon release, the trap door is movable by gravity and in a "springing movement" by the brace member 58 vertically downwardly and into a substantially vertical orientation, the bottom end portion 34 of the trap door being driven against the bottom wall 16 and the trap door being disposed against the front wall 20 and in covering relation with the opening 12.

The catch member 60 is in the form of a pair of L-shaped catch links, which extend downwardly from the top wall 14 of the cage for engaging the second edge portion 66 of the brace member 58. Preferably, the catch links 60 are extensions of a reinforcement member that forms part of the top wall 14. It is to be understood, however, that the catch links could extend from the sidewalls, if desired.

The coil spring 62 has a first end connected to a reinforcement member of the trap door 30 at the bottom end portion thereof and a second end connected to a reinforcement member of the brace member 58. When the trap door is in the first (cage open) position, the coil spring 62 biases the free edge portion 66 of the brace member 58 against the top wall 14 and the bottom end portion 34 of the trap door away from the top wall. Upon rotation of the actuator rod 44, the catch member 46 is released from the trap door, and gravity causes the (free) bottom end portion 34 of the trap door to fall. The force of the coil spring 62 causes the brace member 58 to flip or swing away from the trap door, substantially simultaneously driving the second edge portion 66 of the brace member 58 towards and into engagement with the catch link(s) 60, and the first edge portion 64 (and bottom end portion 34 of the trap door 30) towards the bottom wall 16, resulting in the brace member 58 forcing the trap door downwardly and against the front wall 18.

In the first position, the brace member 58 is folded onto the trap door 30 and squeezed between the trap door 30 and the top wall 14 of the cage, the top wall 14, the brace member 58 and the trap door 30 being generally parallel to one another. The free end or second edge portion 66 of the brace member 58 is spring loaded or biased by the coil spring 62 against the top wall 14 thereby urging the trap door 30 and the brace member 58 away from the top wall 14. The coil spring 62, acting proximate to the hinged connection between the brace member 58 and the trap door 30, urges the brace member and the trap door downwardly and away from the top wall 14 of the cage. The coil spring 62 acts to rotate or pull the brace member 58 away from its overlapped relation with the trap door and drive the trap door into the second position against the front wall 18.

In the second (cage closed) position, the brace member 58 and the trap door 30 are at an acute angle to one another. As noted above, the front wall 18 forms the hypotenuse and the brace member 58 and trap door 30 the legs of a 45° right triangle to provide for maximum force against the trap door. The brace member 58 is generally vertically disposed with its second edge portion 66 positioned proximate the top wall 14 and engaged by the L-shaped catch members 60 formed with the cage structure and its first edge portion 64 forcing the trap door into the closed position.

In operation, the user would place bait "B" in the back of the cage, between the back wall 20 and the trip plate 38. The animal would enter the cage through the front opening 12 and proceed to the bait, stepping onto the trip plate 38, the weight of the animal causing the trip plate to move in a downwardly direction "F" towards the bottom wall 16 of the cage.

Downward rotation of the trip plate 38 is transmitted by the link 52 to the trip rod 44 via the first link 50 at the rearward end of the trip rod 44. Due to its hinged connection, the link 50 rotates (i.e., moves) in a downwardly direction "G" and the trip rod 44 rotates relative to is axis "D", causing the forward end thereof to rotate and the catch link 46 to rotate in the direction "H" and be dislodged from its engagement with the side edge 48 of the trap door 30 whereupon gravity and the coil spring 62 act to drive the trap door downwardly and into closing relation against the front opening 12.

Simultaneously with release of the trap door, the free edge portion 66 of the brace member 58 drives the free end 34 of the trap door downwardly away from the top wall 14, springs upwardly and away from the trap door, and is captivated in the catch links 60 extending from the top wall 14. The hinged first edge portion 64 of the brace member 58 drives the trap door downwardly against the front wall 18. The acutely angled front wall 18 and relationship between the trap door and brace member result in the brace member being generally vertically disposed with the hinged end of the brace member driving the free end of the trap door firmly into a closed position.

To open or reset the animal trap, the user substantially simultaneously forces and rotates the brace member 58 away from the catch links 60 and towards the front wall 18 and the trap door towards the top wall. Sufficient upward movement will bring the trap door into lodged engagement with the catch link 46.

Turning now to FIGS. 5–9, a second embodiment of an animal trap according to this invention, generally indicated by the number 100, comprises an elongated, generally rectangularly shaped cage that is closed on five of its sides with the side corresponding to the front wall thereof defining a closable front opening 112 sized to permit entry of a small animal into the cage to obtain bait "B" placed in the rearward (interior) end of the cage.

In particular, the cage is formed by a top and a bottom wall 114 and 116, a pair of opposed sidewalls 122 and 124, and a back wall 120. A trap door 130 for closing the front opening 112 is hingedly connected to the cage by an axially elongated support bar 136 and is adapted to rotate relative to the support bar and the front opening from a raised (cage open) position to a lowered (cage closed) position. In the raised position, as shown by reference to FIGS. 5, 6, 7A, 7B, and 9A, the trap door is generally horizontally disposed relative to the top and bottom walls 114 and 116 and in juxtaposition with the top wall 114. In the lowered position, as shown by reference to FIGS. 8A and 9B, the trap door is at an acute angle to the top and bottom walls.

Preferably, the walls 114, 116, 122, 124 and 120 of the cage and the trap door 130 are formed of expanded sheet metal, as described hereinabove. In such construction, a single continuous planar rectangular sheet of expanded metal is bent to form the walls 114, 122, 116 and 124, and the two free edges of the sheet thus bent are adjoined (e.g., welded together) to form a rectangular shell structure that is fixedly secured (e.g., welded) to the back wall 120 and in encircling relation thereto whereby to form the rectangular cage having an open front.

The trap door 130 is generally planar, rectangularly shaped, and includes a top edge portion 132 that is hingedly secured to the support bar 136 for rotation relative thereto and a bottom edge portion 134. The support bar 136 has its opposite axial ends 136*a* and 136*b*, respectively, secured to the sidewalls 122 and 124 whereby to be disposed in generally parallel relation to the top and bottom walls 114 and 116 and to position the top edge portion 132 of the trap door proximate to the top wall 114.

In the embodiment shown, the length of the trap door (i.e., the distance between the opposite edge portions 132 and 134) is somewhat greater than the vertical height (i.e., the distance between the top and bottom walls 114 and 116) of the cage, and the width of the trap door is less than the distance between the sidewalls 122 and 124. As such, when mounted, the trap door may swing relative to the cage walls and between the raised and lowered positions.

When in the lowered (or cage closed) position, the trap door is oriented at an acute angle to the top and bottom walls 114 and 116. The bottom edge portion 134 of the trap door engages the bottom wall 116 and the trap door angles inwardly and upwardly towards the top wall.

As will be appreciated from the discussion herein below, a steeper angle will contribute to a trap door closure that is more difficult for the animal to dislodge. However, if too steep, the door may not rotate rapidly and function in the manner of a drop gate. Preferably, the trap door is disposed at an angle of between 60° and 80° relative to the bottom wall 116. More preferably, the trap door is at an acute angle of about 75° to the bottom wall.

A guide structure is provided for guiding the trap door between the raised and lowered positions. Preferably, the guide structure includes a pair of axially elongated guide rods 168 and 170 and a generally rectangularly shaped guide collar 172.

The guide rods 168 and 170, respectively, have opposite end portions 168*a* and 168*b* and 170*a* and 170*b* that are connected to the cage and space the axially extending portion of each guide rod so as to be forwardly from the front opening of the cage and in parallel relation to one another and to the sidewalls 122 and 124. As shown, the end portions 168*a* and 170*a*, and 168*b* and 170*b*, respectively, are fixedly connected to the top and bottom walls 114 and 116. As connected, the axes of the guide rods are generally perpendicular to respective planes including the top and bottom walls 114 and 116 and the axis of the support bar. If desired, the end portions of the guide rods could be connected to the sidewalls 122 and 124

In the embodiment shown, a folded-over reinforcement plate (or frame) (not shown) is secured to the edges of the trap door and also to the free end portions of the walls 114, 122, 116, and 124 of the expanded metal sheet structure whereby to reinforce (or rigidify) the trap door 130 and the front opening 112. Preferably, the opposite end portions 168*a*, 168*b* and 170*a*, 170*b* of the respective guide rods 168 and 170 are fixedly connected to the portion of the reinforcement frame that extends along the top and bottom walls 114 and 116.

The guide collar 172 is adapted to connect the trap door 130 to the guide rods 168 and 170 and constrain the combined vertical and rotational movement of the trap door relative to the front opening 112 of the cage. The guide collar 172 comprises a pair of axially elongated guide beams 174 and 176 connected to a pair of centrally bored guide sleeves 178 whereby to form a rectangular shaped opening sized to fit about the trap door. The guide sleeves 178 are mounted to a respective guide rod 168 and 170 for sliding movement therealong.

In the embodiment shown, when the guide sleeves 178 are mounted to the guide rods, the guide beams 174 and 176 are generally horizontally disposed and in parallel spaced apart relation with one another and with the top and bottom walls 114 and 116. The guide beams 174 and 176 are in juxtaposition with the exterior and interior faces of the trap door (i.e., distal and proximate to the cage interior) with the guide rods spacing the guide beam 174 outwardly from the front opening of the cage.

As an important feature of this embodiment, the guide beam 174 serves several functions. First, the guide beam 174 functions as a handle for carrying and positioning the cage. The guide beam or handle 174 enables the user to carry the cage to a location for trapping an animal and also to carry the cage with a trapped animal to a remote location for release. Further, the guide beam or handle enables the user to position or otherwise maneuver the cage, such as for turning the cage 180° onto itself and positioning the top wall 114 so as to be engaging the ground, such as for effectuating release of an animal and resetting of the cage.

Second, the guide beam 174 provides the user with a way to set/reset the trap. The user grasps the handle and lifts the guide collar 172 upwardly, causing the interiorly disposed guide beam 176 to engage the rear (interiorly facing) side of the trap door and progressively cam the trap door upwardly, enabling the user to access an actuator rod 140, a release plate 164, and a coil spring 162 therewithin—useful in setting/resetting the trap. The trap setting, resetting and/or trap release operation is described in greater detail herein below.

Preferably, a circular disc or spacer 171 is provided on the exterior guide beam 174 for spacing the axial extension of the guide beam 174 from direct contact with the exteriorly facing surface of the trap door. In some environments, problems might arise from material on the trap door resisting downward sliding movement between the guide collar and the trap door. The spacer disc 171 engages the trap door in a "point contact" and transmits gravity forces from the collar 172 to the trap door to enhance closing movement of the trap door.

Preferably and according to this invention, a releasable latching structure is provided for maintaining the trap door 130 in the raised or lowered positions. The latching structure comprises a trip plate 138, a link arm 144 fixedly connected to the trip plate, the axially elongated actuator rod 146 having a rearward end portion 148 connected to the link arm 144 and a forward end portion 150, and a latch keeper 152 releasably connectible to the forward end portion 150 of the actuator rod. The trip plate 138 is generally planar, rectangular in shape, and has a lateral width that is substantially the same as the distance between the sidewalls 122 and 124. The trip plate is hingedly connected along a laterally extending bottom edge portion 142 thereof to a pivot bar 154 extending laterally between and connected to the sidewalls of the cage, such that a distal laterally extending top edge portion 140 of the trip plate is capable of rotation towards the bottom wall 116 of the cage. While the trip plate is preferably comprised of expanded metal, the plate may also be comprised of a mesh screen or like apertured material.

The link arm 144 is proximate to the pivot bar 154 and projects perpendicularly upwardly from the trip plate 138 to a connectible end portion 145. The end portion 145 is pivotably connected to the rearward end portion 148 of the actuator rod 146 such that with downward movement (i.e., rotation) of the trip plate, the end portions 145 and 148 will rotate and/or move towards the back wall 120 of the cage and the link arm will pull the actuator rod 146 rearwardly and in a direction away from the latch keeper 152.

The latch keeper 152 is connected to the cage by a plate member 153 and is proximate the top wall of the cage and the front opening thereof for releasably engaging the interior guide beam 176. Preferably, the plate member 153 is connected to the reinforcement frame 126 forming the shape of the open end.

The latch keeper 152 comprises a latch housing 184 including forward and rearward housing portions 186 and 188 that form an elongated bore 190 for slidably receiving the forward end portion 150 of the actuator rod therewithin, and a U-shaped locking wheel 192. The forward housing portion 186 is generally formed by a plate member having been folded-over to include a pair of parallel, vertically disposed, spaced-apart plate members. The locking wheel 192 is connected to the forward housing portion 186 by a pin 193 for rotation relative within the folded over plate members and between a locked and an unlocked position.

The locking wheel 192 includes an upper arm 194 proximate to the top wall, a central body portion provided with a locking detent 196 sized to receive the forward end portion 150 of the actuator rod, and a lower arm 198 provided with a shoulder 199 which is adapted to engage a lower edge 187 of the forward housing portion 186. The locking detent 196 includes an axial flat and a shoulder portion and is formed by cutting away a portion of the locking wheel.

The lower edge 187 places a limit on the clockwise rotation (as viewed in FIG. 9A) of the lower arm 198 following release and downward movement of the trap door from the raised (cage open) position and positions the upper arm 194 for effectuating counterclockwise rotation (as viewed in FIG. 9B) of the locking wheel 192 following upward movement of the trap door from the lowered (cage closed) position back into the raised position.

An axially elongated, generally cylindrical coil spring 162 has opposite ends 162a and 162b, respectively, connected to the rearward housing portion 188 and the actuator rod 146 and acts to pull the forward end portion 150 of the actuator rod 146 towards the locking wheel 192 for locking engagement within the locking detent 196 therein. Preferably, the actuator rod is generally cylindrical and the coil spring is circumposed around the exterior of the actuator rod.

According to a particular feature of this invention, an axially elongated release plate 164 is slidably connected to the actuator rod and has an end portion thereof connected to the rearward end 162b of the coil spring. Manual force on the release plate 164 in a direction away from the locking wheel 192 operates to axially withdraw the forward end portion 150 of the actuator rod from captured engagement within the locking detent 196 and releases the locking wheel for rotation and repositioning of the arms 194 and 198.

Preferably, the forward end portion 150 and the axial flat of the detent 196 are formed with complementary tapered faces, indicated generally at 151 and 191. Advantageously, when the trap door is in the raised (cage open) position (See FIG. 9A), the tapered face 151 of the actuator rod provides a smooth seated engagement with the locking detent. When the trap door is in the lowered (cage closed) position (See FIG. 9B), the tapered face 151 engages the outer periphery of the locking wheel 192 whereby to inhibit retrograde rotation of the locking wheel and maintain the locking shoulder 199 positioned against the lower edge 187 of the forward housing 186. Further, upon resetting of the locking wheel, the tapered face 151 enhances smooth reentry into the locking detent.

In operation, to set the cage, the cage is taken to a location to trap an animal and the bottom wall placed on the ground. The exterior guide beam or handle 174 of the guide collar 172 is grasped and lifted vertically towards the top wall 114. The trap door 130 is lifted slightly and the release plate 164 pulled rearwardly against the bias of the coil spring 162, the plate pulling the actuator rod rearwardly from engagement within the locking detent, thereby releasing the locking wheel 192 for rotation. The locking shoulder 199 of the locking wheel 192 is rotated into position against the lower edge 187 of the forward housing portion 186, thereby positioning the upper and lower arms 194 and 198 of the locking wheel to open downwardly.

Alternatively, to reset the trap, the cage could merely be turned over onto itself. The top wall 114 would be supported on the ground and the bottom wall 116 would be facing upwardly The handle (exterior guide beam) 174 of the guide collar 172 is grasped and lifted vertically, causing the interior beam 176 to simultaneously engage and lift the trap door towards the top wall of the cage. Upon sufficient upward movement, the interior guide beam 176 engages the upper arm 194 of the locking wheel, causing the locking wheel and the upper and lower arms thereof to rotate. As a result, the locking detent 196 is rotated into alignment with the bore 190, whereupon the forward end portion 150 of the actuator rod 146 is biased into the locking detent by the coil spring 162. The animal trap is then set to capture an animal.

Bait is set into the interior of the cage, between the trip plate 138 and the back wall 120. Because of the apertured expanded metal wall structure, a small animal can both see and smell the bait in the trap and be attracted thereto A small animal enters the cage and steps on the trip plate 138, causing the trip plate 138 to be depressed, the trip plate and link arm 144 to rotate, the actuator rod to be pulled rearwardly, and the forward end portion 150 of the actuator rod to be withdrawn from the locking detent. The locking wheel 192 is released and rotates relative to the forward housing portion 186, causing the upper and lower arms 194 and 198 thereof to rotate and be oriented so as to open downwardly (towards the bottom wall of the cage). Rotation of the lower arm 198 releases the interior guide beam 176 of the guide collar and brings the shoulder 199 of the arm 198 into engagement with the lower edge 187 of the forward housing portion 186, whereupon the tapered face 151 at the forward end of the actuator rod is driven against the locking shoulder to maintain the locking wheel in the rotated to position.

Substantially simultaneously with the actuator rod being disconnected from engagement with the locking detent, the force of gravity will act to rotate the lower arm, whereupon the guide collar and any "enhancement" weights that may have been added to the trap door and/or guide collar will cause the guide collar and the trap door to fall. The lower edge portion 134 of the trap door will come to rest on the bottom wall 116 and be positioned thereagainst by the guide collar.

The guide collar 172 will resist the trap door from opening as a result of any horizontal opening forces transmitted against the trap door by an animal trying to escape from the cage. That is, the collar will inhibit vertical rise of the trap door.

For release, the exterior guide beam or handle 174 is grasped, and used to carry the cage and trapped animal to a desired release location. The handle is again grasped and the animal cage is turned 180° such that the top wall 114 is on the ground. At this point, gravity will cause the guide collar 172 and the trap door to fall towards the top wall. The interior guide beam 176 will act against the interior wall of the trap door and gravity will urge the guide collar against the trap door and the guide collar and the trap door to fall downwardly towards the locking wheel.

The guide beam 176 will fall into the space between the upwardly open arms 194 and 198, engage the upper arm 198, and cause the locking wheel to rotate, thereby causing the locking detent to be rotated into alignment with the actuator rod. The coil spring will then bias the forward end portion of the actuator rod into the locking detent, resetting the animal cage for another trapping.

Accordingly, there is provided herein animal cages for capturing, without harming, small animals, the cages being simple, efficient, having positive closure arrangements that are gravity and/or gravity and spring assisted in operation.

Although various embodiments of the invention have been disclosed for illustrative purposes, it is to be understood that one skilled in the art can make variations and modifications without departing from the spirit of the invention.

In a further embodiment hereof and as shown in FIGS. 10 and 11, it is contemplated that the guide mechanism or assembly that engulfs the cage door, i.e., the guide rods, guide collar, and guide beams may be replaced with a handle assembly.

In accordance herewith, a cage door 210 has an outwardly and laterally extending door latch rod 212 secured thereto. The door latch rod 212 is fixed to the cage door 210 by any suitable means such as by welding or the like and is used to raise the door to a cage open position. Alternatively, the handle may be pivotally secured to the door.

As shown the latch mechanism, generally denoted at 214 includes a keeper assembly 216 and a rotatable wheel 218 similarly constructed to the wheel and rod 192, 193 discussed hereinabove. However, according hereto, the handle 212 is positively locked between the upper and lower areas 194, 198, respectively, of the wheel 192.

Thus, when the handle is raised it causes the door to rotate upwardly therewith. When the handle engages the arm 194 it causes rotation of the wheel 192 and the detent 196 is positively locked by the rod 150 in the manner heretofore discussed. When the plate 138 is positioned in the same manner discussed hereinabove, rotation of the wheel about the pin 193 releases the handle 212 permitting the door 210 to drop.

What is claimed is:

1. An animal trap for animals, the trap comprising:
   a mesh cage with a bottom wall, a top wall, a back wall, an open front having a predetermined size so as to admit an animal to be trapped, and a sidewall joining the top, bottom and back walls;
   a trap door for closing the open front hingedly affixed to the top wall of the cage and movable between raised and lowered positions, said trap door having a bottom edge adapted to be proximate to the top and bottom walls when the trap door is in said raised and lowered positions, respectively;
   a door latch rod attached to the trap door;
   a lock wheel for releasably holding the door latch rod and the trap door in the raised position proximate to the top wall of the cage, the lock wheel being operably rotatable from a holding position, in which the door latch rod is held in a raised position, to a releasing position, in which the lock wheel is disengaged from the door latch rod, thereby releasing the door latch rod and trap door;
   a tripping mechanism responsive to an animal entering the cage and contacting the tripping mechanism to operably release the lock wheel for rotation between said holding and releasing positions; and
   a resetting mechanism for resetting the trap door in the raised position, the resetting mechanism including at least a portion of said door latch rod acting on said lock wheel to rotate said lock wheel into the holding position.

2. An animal trap comprising:
   a cage having opposite ends and including a bottom wall, a pair of side walls, a top wall, a back wall forming one of said ends and an open front forming the other of said ends, the walls being comprised of an apertured material and the open front being of a size to permit entry of an animal to be trapped;
   a closure member comprised of an apertured material for closing the open front, the closure member being rotatably attached to the cage and operably movable from a raised cage open position to a lowered cage closed position;
   a locking mechanism coupled to said cage for releasably holding the closure member in the cage open position and releasing the closure member from the cage open position;
   a tripping mechanism, coupled to the locking mechanism and said cage, for releasing the closure member from the cage open position for movement to the cage closed position due to the force of gravity and in response to an animal entering the cage and tripping the mechanism; and
   a door latch handle attached to an outer peripheral edge of the closure member, the door latch handle extending outwardly and laterally from the closure member and being releasably connected to the locking mechanism when the closure member is disposed in the cage open position;
   wherein said locking mechanism comprises a lock wheel rotatably connected to said cage for rotation between holding and releasing positions corresponding to said raised and lowered positions respectively, the lock wheel including a first and a second arm and a lock detent.

3. The animal trap as recited in claim 2, wherein said tripping mechanism comprises:
   a trip plate responsive to an animal entering the cage;
   an elongated actuator rod having a rearward end connected to the trip plate and a forward end engageable with the lock detent when the lock wheel is in said holding position; and
   a coil spring biasing the actuator rod towards the lock wheel.

4. An animal trap for capturing and restraining live animals, said animal trap comprising:
   a mesh cage having a bottom wall, a top wall, a back wall, a front opening, and a pair of side walls joining the top, bottom, and back walls;
   a trap door having a top edge hingedly connected to the cage and a bottom edge, the trap door rotating from a raised position, wherein access by an animal to the interior of the cage through the opening is permitted, to a lowered position, wherein the trap door closes the opening and movement through the opening is prevented;

a door latch rod attached to the trap door;

a trip plate hingedly mounted to the cage and responsive to an animal having entered the cage;

a lock wheel mounted for rotation to one of said side walls proximate to the front opening, the lock wheel including a first and a second arm member and a locking detent, the lock wheel being operably rotatable between first and second positions corresponding to the raised cage open and lowered cage closed positions of the trap door;

a trip rod having a rearward end portion connected to the trip plate and a forward end portion movable into and from engagement with the locking detent when the lock wheel is in said first and second positions, respectively, the forward end portion being withdrawn from the locking detent by the trip plate; and a spring member coupled to the cage for biasing the forward end portion of the trip rod towards the lock wheel;

wherein in the raised position, the trip rod is engaged in the lock detent to prevent rotation of the lock wheel and the door latch rod is supported on the second arm member of the lock wheel, thereby supporting the trap door in juxtaposition with the top wall of the cage, depression of the trip plate causing the trip rod to be withdrawn from the detent, thereby allowing the lock wheel to rotate and the door latch rod to be released, whereupon the door latch rod and trap door fall by gravity to the lowered position, and wherein upward movement of the door latch rod drawing the trap door upwardly and the door latch rod into engagement with the first arm member to rotate the lock wheel and lock detent into receiving alignment with the trip rod and the second arm member into position for supporting the door latch rod.

* * * * *